(12) United States Patent
Murray

(10) Patent No.: US 8,011,884 B1
(45) Date of Patent: Sep. 6, 2011

(54) FAN BLADE ASSEMBLY FOR A GAS TURBINE ENGINE

(75) Inventor: Stephen E Murray, Port St. Lucie, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 639 days.

(21) Appl. No.: 12/184,802

(22) Filed: Aug. 1, 2008

Related U.S. Application Data

(60) Provisional application No. 60/963,084, filed on Aug. 2, 2007.

(51) Int. Cl.
*F01D 25/08* (2006.01)
*F04D 29/58* (2006.01)

(52) U.S. Cl. ........ 415/180; 415/116; 415/120; 415/229; 416/183; 416/218

(58) Field of Classification Search .................. 415/116, 415/120, 175, 176, 177, 180, 229; 416/183, 416/218
See application file for complete search history.

(56) References Cited

U.S. PATENT DOCUMENTS

| 4,221,540 | A  | * | 9/1980  | Savonuzzi ................... 416/183 |
| 6,035,627 | A  | * | 3/2000  | Liu ................................ 60/785 |
| 6,286,303 | B1 | * | 9/2001  | Pfligler et al. ................ 415/110 |
| 6,581,386 | B2 | * | 6/2003  | Young et al. .................... 60/748 |
| 7,048,214 | B2 | * | 5/2006  | Johnson et al. ................. 241/65 |
| 7,748,952 | B1 | * | 7/2010  | Schopf et al. ................ 415/116 |
| 7,841,834 | B1 | * | 11/2010 | Ryznic .......................... 416/224 |
| 2003/0061815 | A1 | * | 4/2003 | Young et al. .................... 60/748 |

* cited by examiner

*Primary Examiner* — David Nhu
(74) *Attorney, Agent, or Firm* — John Ryznic

(57) ABSTRACT

A small twin spool gas turbine engine with a forward end of the engine supported by bearings that are cooled by passing a cooling fluid such as cooling air bled off from the compressor with a liquid lubricant sprayed into the cooling air that is then passed through the bearing to prevent overheating. The cooling fluid is then discharged from the bearing cooling circuit out the front end of the engine through a number of discharge holes formed within the threaded nut that secures the fan blade assembly to the low speed rotor shaft. The threaded nut includes a plurality of slanted holes that slant outward from the rotational axis in the direction of fluid discharge.

10 Claims, 2 Drawing Sheets

FAN BLADE ASSEMBLY FOR A GAS TURBINE ENGINE

CROSS-REFERENCE TO RELATED APPLICATIONS

This application is claims the benefit to an earlier filed U.S. Provisional application 60/963,084 filed on Aug. 2, 2007 and entitled SMALL TWIN SPOOL GAS TURBINE ENGINE the entire disclosure of which is herein incorporated by reference.

FEDERAL RESEARCH STATEMENT

The US Government has a paid-up license in this invention and the right in limited circumstances to require the patent owner to license others on reasonable terms as provided for by the terms of Contract No. FA9300-04-C-0008 awarded by the United States Army.

BACKGROUND OF THE INVENTION

1. Field of the Invention

The present invention relates generally to a small twin spool gas turbine engine, and more specifically to fan blade to rotor shaft connection of a gas turbine engine.

2. Description of the Related Art Including Information Disclosed Under 37 CFR 1.97 and 1.98

In a twin spool gas turbine engine, a low speed rotor shaft connects a low pressure turbine to the low pressure compressor which is typically a fan blade assembly. A high speed rotor shaft connects the high pressure turbine to the high pressure compressor. The high speed rotor shaft rotates around the inner low speed rotor shaft. Both rotor shafts are supported by bearings on the ends of the shafts.

In a small gas turbine engine, such as the size used to power an unmanned aero vehicle (UAV), the engine is so small that the rotor shafts will rotate at very high speeds. Also, to reduce the size of the engine the spacing between the forward and aft bearings is reduced to control the rotor dynamics problems that arise due to the high rotation speeds. The bearings that support the rotor shafts are thus exposed to very high temperatures and require cooling in order to make such a small engine possible.

At these high rotation speeds, the rotor shafts are also subject to high levels of vibration that must be addressed in the design to also make the small engine possible.

BRIEF SUMMARY OF THE INVENTION

It is an object of the present invention to provide for a small twin spool gas turbine engine less than 300 pounds of thrust.

It is another object of the present invention to provide for a small twin spool gas turbine engine that is compact in the axial direction in order to reduce the rotor dynamic effects.

It is another object of the present invention to provide for a small twin spool gas turbine engine in which the forward bearings are cooled to prevent overheating.

It is another object of the present invention to provide for a small twin spool gas turbine engine with a compressor fan assembly secured to the rotor shaft.

The present invention is a small twin spool gas turbine engine under the 300 pound thrust range in which the compressor fan assembly is secured to the low speed rotor shaft by a threaded nut that includes a plurality of axial extending cooling fluid passages in which the cooling fluid used to cool the forward end bearings can be discharged from the bearing cooling circuit of the engine. The forward bearings are cooled by passing a lubricant through the bearing cooling passage to prevent the bearings from overheating. The bearings are secured in place between the high pressure compressor rotor disk and the low pressure fan rotor disk with the threaded nut secured to the front end of the low speed rotor shaft.

DETAILED DESCRIPTION OF THE INVENTION

Figure 1:
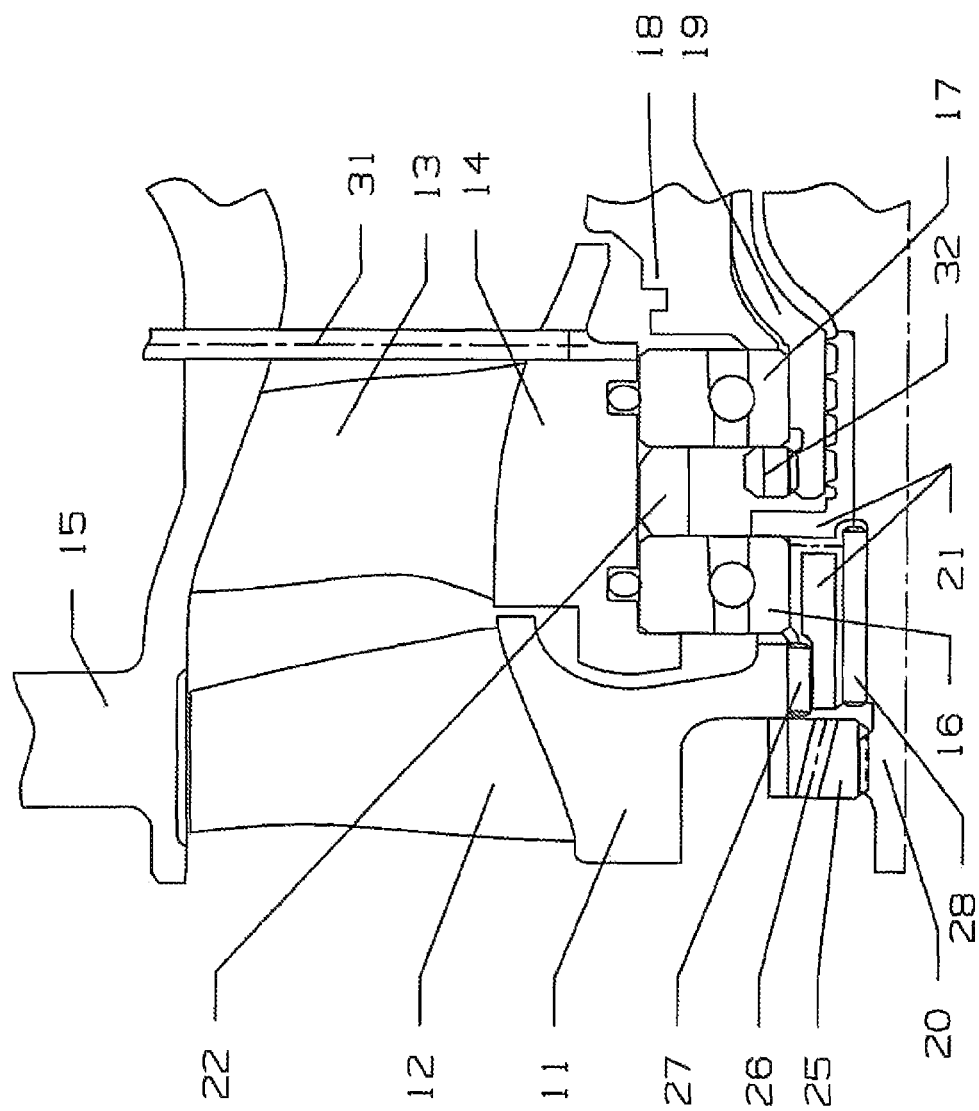
FIG. 1 shows a cross section view of the forward end bearing assembly for the small twin spool gas turbine engine of the present invention.
Figure 2:
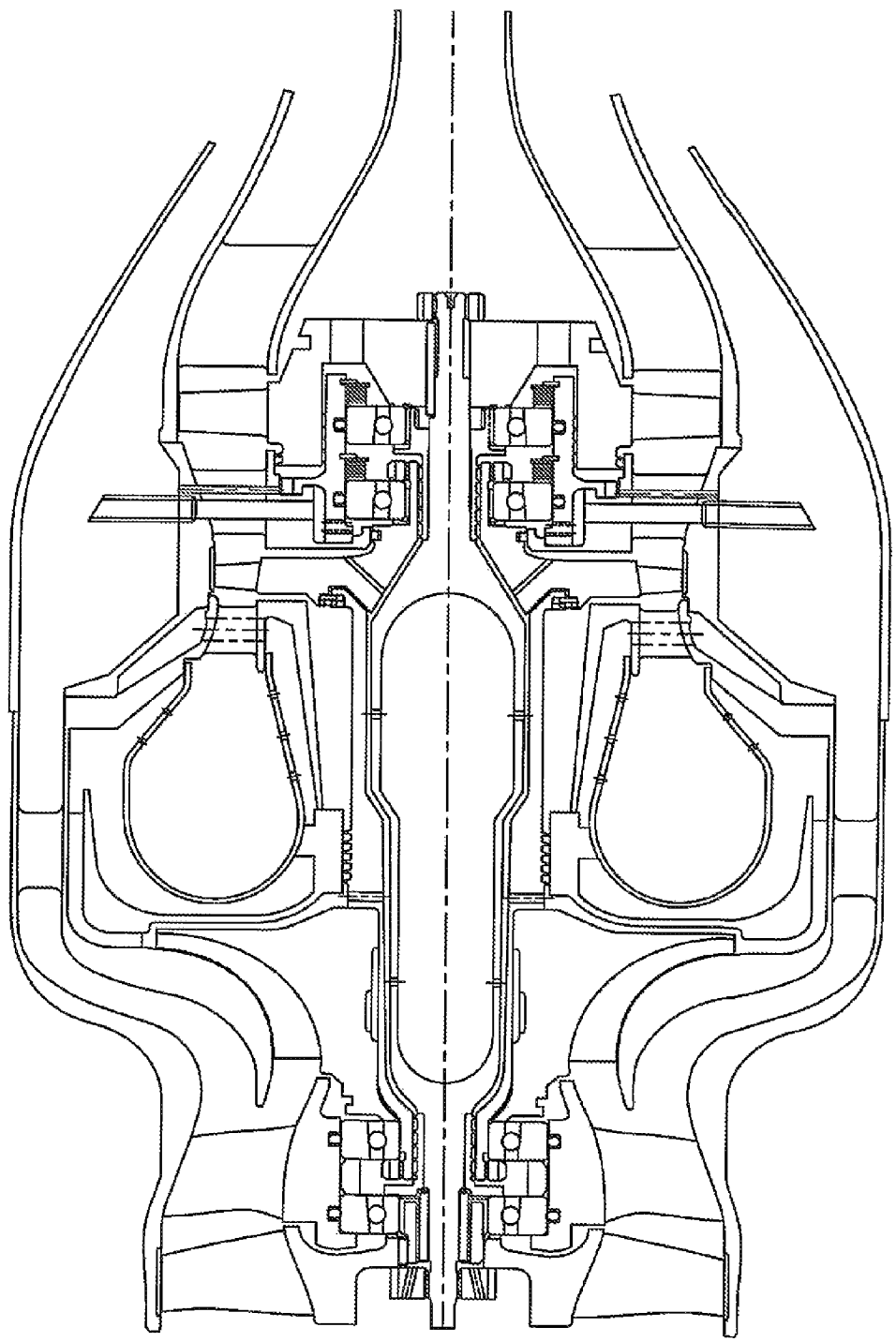
FIG. 2 shows a cross section view of the twin spool gas turbine engine of the present invention.

The present invention is a bearing assembly and arrangement for a small twin spool gas turbine engine that allows for such a small engine to overcome the problems with rotor dynamics and cooling of the bearings. FIG. 1 shows the fan blade assembly which forms the low pressure compressor for the engine secured to the low speed rotor shaft. The fan blade assembly includes a fan rotor disk 11 with a plurality of fan blades 12 extending outward. A stator vane assembly is located immediately behind the fan blades and includes an inner shroud that forms a support surface for the bearings that support the inner and outer rotor shafts of the engine. The guide vane assembly includes an outer shroud 15 and an inner shroud 14 with a plurality of guide vanes 13 extending between the shrouds.

The low speed bearing 16 and the high speed bearing 17 are supported on the inner shroud 14 with at least one O-ring secured between the inner shroud 14 and the outer race of the bearing to provide damping for the rotor shafts. The high pressure compressor includes a forward extending portion 18 that abuts against the inner race of the high speed bearing 17. The inner race of the high speed bearing is secured onto an outer surface of the high speed rotor shaft 19 between a threaded nut 21 and forward extending portion 18.

The low speed bearing 16 is includes an outer race secured up against the underside of the inner shroud 14 and an inner race secured to an axial sleeve member 21 which is secured to the low speed inner rotor shaft 20. The axial sleeve abuts against the inner rotor shaft on the aft end, and includes a radial extending portion that abuts against the aft side of the inner race of the low speed bearing 16.

The two bearings 16 and 17 are also held in place by an annular wedge member 22 that abuts against the outer races of the bearings. The wedge member 22 is formed of two half circular annular pieces that, when placed together, form a full annular member around the bearing outer races.

The low speed bearing 16 is compressed between the fan rotor disk 11 and the axial sleeve 21 radial extending portion. The high speed bearing is compressed between the threaded nut 21 and the high pressure compressor rotor disk axial extension 18. The fan compressor 11 is secured onto the low speed rotor shaft 20 by a threaded nut 25 that includes one or more axial extending holes 26 that connect the aft side to the forward side of the threaded nut 25 to allow for the bearing lubricant fluid to pass out from the bearings. The threaded nut 25 compresses the fan rotor disk 11 against the inner race of the low speed bearing 16 to secure the fan assembly to the rotor shaft. In this embodiment, the cooling fluid passages 26 are shown as holes formed within the nut itself. In another embodiment, the passages could be slots or grooves formed on the inner surface of the nut such that the outer surface of the shaft and the inner surface of the nut define the passages.

A lubricant used to cool the bearing 16 and 17 is supplied to a location aft of the high speed bearing 17 and passes through the two bearings 16 and 17 in the direction toward the front end of the engine. In this embodiment, a lubricant supply tube 31 extends through the outer shroud 15 of the guide vane assembly, through the bypass channel in the engine, and into the inner shroud 14 of the guide vane assembly to open into the space behind the high speed bearing 17. The compressed air from the fan will leak from the bypass channel of the engine and flow through the bearings and carry the lubricant along for cooling the bearings. The axial sleeve 21 forms passages for the lubricant on the outer surface and the inner surface of the sleeve in which the cooling fluid can flow between the inner race of the low speed bearing 16 in a direction toward the turbine section, then in a radial inward direction toward the inner rotor shaft 11, and then back toward the front of the engine through a passage formed between the axial sleeve 21 and the outer surface of the low speed rotor shaft 20. This cooling passage provides additional cooling to the inner race of the low speed bearing.

An outer pin 27 secures the fan rotor disk 11 to the axial sleeve against relative rotation, and an inner pin 28 secures the axial sleeve to the low speed shaft 20 against relative rotation. Thus, the fan rotor disk 11 is secured to the inner rotor shaft 20 by the two pins 27 and 28 acting through the axial sleeve 21. The threaded nut 25 secures the fan rotor disk 11 to the inner rotor shaft 20 and the axial hole or holes 26 allow for the lubricant fluid to flow out from the bearing cooling passages that serpentines round the axial sleeve 21.

I claim the following:

1. An axial compressor comprising:
   a compressor rotor disk with a plurality of blades extending out from the rotor disk;
   a compressor rotor shaft with one end of the compressor rotor shaft extending out from a central opening in the compressor rotor disk;
   a threaded nut securing the compressor rotor disk against axial displacement to the compressor rotor shaft; and,
   the threaded nut forms at least one cooling fluid passage connecting the forward side to the aft side of the threaded nut to allow for cooling fluid to be discharged from within the axial compressor.

2. The axial compressor of claim 1, and further comprising:
   the at least one cooling fluid passage within the nut is a passage formed within the threaded nut.

3. The axial compressor of claim 1, and further comprising:
   the at least one cooling fluid passage within the nut is slanted outward from the aft side to the forward side of the threaded nut.

4. The axial compressor of claim 3, and further comprising:
   the threaded nut includes a plurality of slanted passages extending around the threaded nut.

5. The axial compressor of claim 1, and further comprising:
   the axial compressor is a fan blade assembly for a twin spool gas turbine engine.

6. The axial compressor of claim 5, and further comprising:
   the threaded nut secures a low speed bearing in an axial compression state between the compressor rotor disk and the compressor rotor shaft.

7. The axial compressor of claim 6, and further comprising:
   an axial sleeve is secured onto an end of the low speed rotor shaft against relative rotation; and,
   the axial sleeve includes a radial projecting that forms an axial abutment for an inner race of the low speed bearing of the axial compressor.

8. The axial compressor of claim 7, and further comprising:
   the axial sleeve includes an aft end that abuts against the low speed rotor shaft.

9. The axial compressor of claim 7, and further comprising:
   the axial sleeve forms a first slot on the outer surface and a second slot on the inner surface;
   a first axial pin secured within the first slot to prevent relative rotation between the axial sleeve and the compressor rotor disk; and,
   a second axial pin secured within the second slot to prevent relative rotation between the axial sleeve and the compressor rotor shaft.

10. The axial compressor of claim 7, and further comprising:
    the axial sleeve forms a cooling fluid passage to channel cooling fluid passing through the low speed bearing and into the axial hole within the threaded nut.

* * * * *

UNITED STATES PATENT AND TRADEMARK OFFICE
CERTIFICATE OF CORRECTION

| | | |
|---|---|---|
| PATENT NO. | : 8,011,884 B1 | Page 1 of 1 |
| APPLICATION NO. | : 12/184802 | |
| DATED | : September 6, 2011 | |
| INVENTOR(S) | : Stephen E. Murray | |

It is certified that error appears in the above-identified patent and that said Letters Patent is hereby corrected as shown below:

Col. 1 lines 15-19 please replace paragraph 0002 with the following new paragraph:

[0002]    The US Government has a paid-up license in this invention and the right in limited circumstances to require the patent owner to license others on reasonable terms as provided for by the terms of Contract No. W31P4Q-05-C-R003 awarded by the United States Army.

Signed and Sealed this
Fourteenth Day of August, 2012

David J. Kappos
*Director of the United States Patent and Trademark Office*